UNITED STATES PATENT OFFICE.

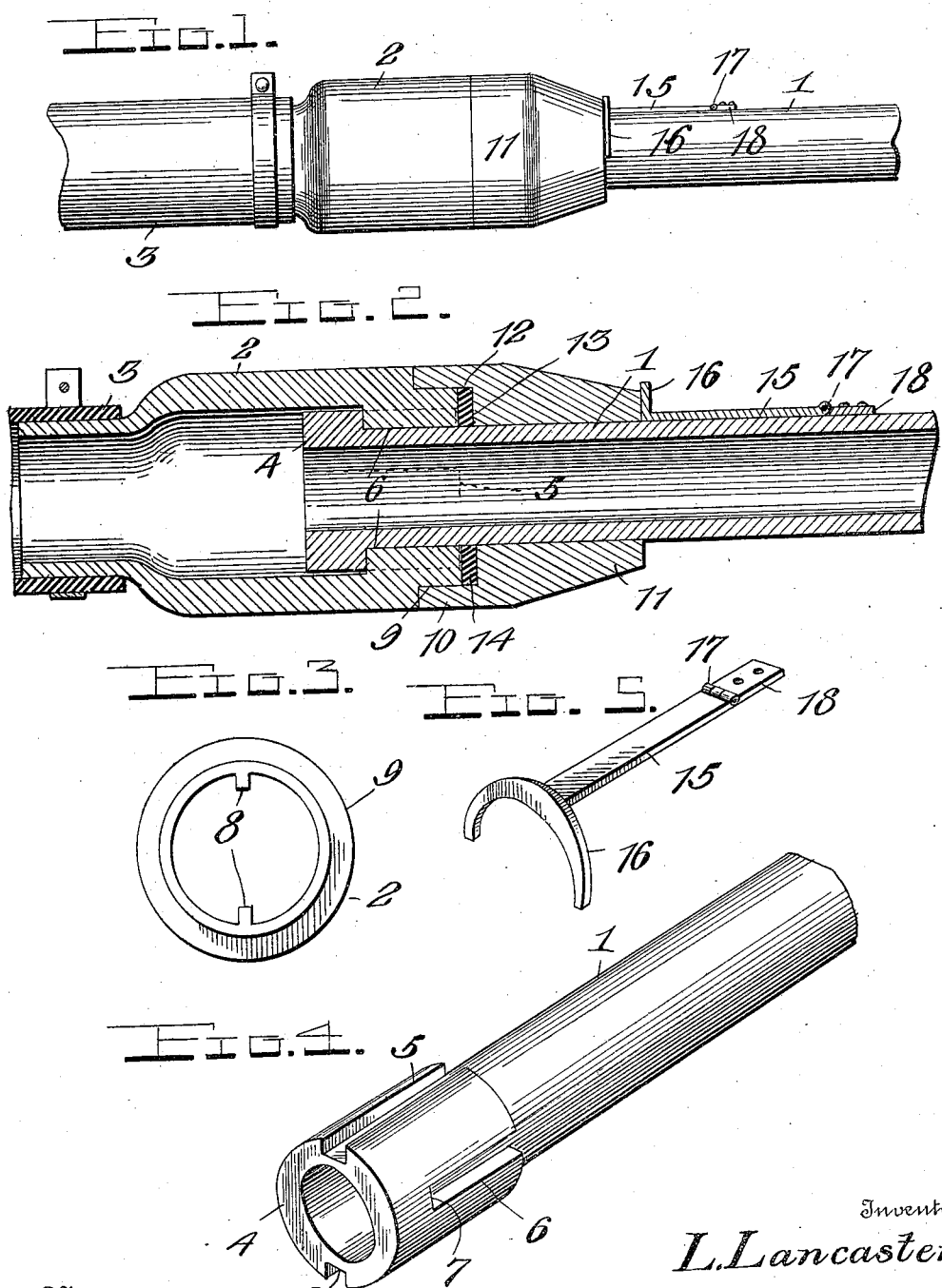

LOUELLA LANCASTER, OF QUINCY, KENTUCKY.

HOSE-COUPLING.

975,138.

Specification of Letters Patent.   Patented Nov. 8, 1910.

Application filed March 23, 1910.   Serial No. 551,039.

*To all whom it may concern:*

Be it known that I, LOUELLA LANCASTER, a citizen of the United States, residing at Quincy, in the county of Lewis and State of Kentucky, have invented certain new and useful Improvements in Hose-Couplers, of which the following is a specification, reference being had to the accompanying drawings.

This invention relates to improvements in quick detachable hose couplers for use in connecting a hose to a hydrant, fire plug or the like, or connecting two hose or pipe sections.

The object of the invention is to provide a simple and practical device of this character in which the use of screw threads is obviated, and which will permit the two members to be quickly and easily connected or separated.

With the above and other objects in view, the invention consists of the novel construction, combination and arrangement of parts, hereinafter fully described and claimed, and illustrated in the accompanying drawings in which:—

Figure 1 is a side elevation of a hose or pipe coupler constructed in accordance with the invention; Fig. 2 is an enlarged longitudinal section through the same; Fig. 3 is an end view of the outer member of the coupler; Fig. 4 is a perspective view of the inner member; and Fig. 5 is a perspective view of the locking device.

The invention comprises inner and outer tubular members 1, 2, which are adapted to be easily engaged or disengaged, and which may be connected to hose or pipe sections or to a pipe for a hydrant, fire plug or the like. As illustrated, the outer section 2 has a hose 3 connected to one of its ends, while the inner section 1 may form a part of and be connected to a hydrant or fire plug. The inner section 1 is of cylindrical shape and has at its extremity an enlarged cylindrical head 4 which contains one or more longitudinal grooves 5 extending from end to end of the same, and one or more longitudinal notches or seats 6 which extend from the inner end of the head to points suitably distant from its outer end, whereby stop shoulders 7 are formed. In practice, two of the grooves 5 are preferably employed and they are arranged at diametrically opposite points, and two of the seats 6 are also provided and arranged at opposite points and at points midway between the grooves 5, as will be understood on reference to Fig. 4.

The outer member 2 has an internal bore of sufficient size to receive the head 4, and formed in said bore at opposite points are two longitudinally extending ribs or projections 8 of such size that they may pass through the grooves 5 and enter the seats 6. The free end of the member 2 is formed with an annular groove 9 which receives a flange 10 on a guard sleeve 11 mounted to slide longitudinally on the section 1. The outer extremity of the sleeve 11 is formed with an annular concentric groove 12 which provides the flange 10 and an annular shoulder 13, on which latter is arranged a gasket or packing ring 14 of rubber or the like to engage the extremity of the member 2 and thereby provide a fluid-tight joint or connection. The sleeve 11 is retained in its effective position by a lock or latch 15 preferably in the form of a bar having at one end a semicircular-shaped head 16 to straddle the member 1 and engage the extremity of the sleeve 11, and having its other end hinged at 17 to an attaching plate 18 suitably secured to the member 1.

In using the device, assuming the members to be engaged and locked, as shown in Figs. 1 and 2, when it is desired to separate the members, the latch 15 is swung upwardly so that the sleeve 11 can be slid rearwardly on the member 1. The member 2 is then moved inwardly on the head 4 to disengage the ribs 8 from the seats 7, and said member 2 is then given a quarter turn to bring the ribs into alinement with the grooves 5, whereupon the member 2 may be moved outwardly and longitudinally of the member 1 to disengage the former from the latter. By reversing this operation, the member 2 may be quickly and easily applied to and locked upon the member 1 to provide an effective fluid-tight joint or connection.

From the foregoing it will be seen that the invention provides a simple and practical device of this character which will obviate the use of screw threads and permit the members or sections of the coupler to be quickly and easily engaged with or disengaged from each other. The simple construction of the device enables it to be produced at a small cost and renders it strong and durable.

Having thus described the invention, what is claimed is:

1. A device of the character set forth comprising inner and outer tubular members detachably engaged with each other, a guard sleeve slidable on the inner member to retain the outer member in position on the latter, and a latch pivoted on the inner member and adapted to engage said sleeve to retain it in its effective position.

2. A device of the character set forth comprising an outer member formed in its bore with a projection, an inner member having a head to enter the outer member and formed with a groove extending from end to end of said head and a seat of less length than said head, whereby the projection on the outer member may be passed through the groove in said head and brought into engagement with said seat, a guard sleeve slidable on the inner member and adapted to engage the outer member to retain the projection in said seat, and a locking means for said sleeve.

3. A device of the character set forth comprising an outer member formed in its bore with a projection, an inner member having a head to enter the outer member and formed with a groove extending from end to end of said head and a seat of less length than said head, whereby the projection on the outer member may be passed through the groove in said head and brought into engagement with said seat, a flanged guard sleeve slidable on the inner member and adapted to engage the outer member to retain the projection in said seat, a packing ring in said sleeve, and a locking means for said sleeve.

4. A device of the character set forth comprising an outer member formed in its bore with a projection, an inner member having a head to enter the outer member and formed with a groove extending from end to end of said head and a seat of less length than said head, whereby the projection on the outer member may be passed through the groove in said head and brought into engagement with said seat, a guard sleeve slidable on the inner member and adapted to engage the outer one to retain the projection in said seat, and a pivoted latch on the inner member to engage the guard sleeve and retain it in effective position.

In testimony whereof I hereunto affix my signature in the presence of two witnesses.

LOUELLA LANCASTER.

Witnesses:
O. P. POLLITT,
O. P. TANNIAN.